Figure 1:
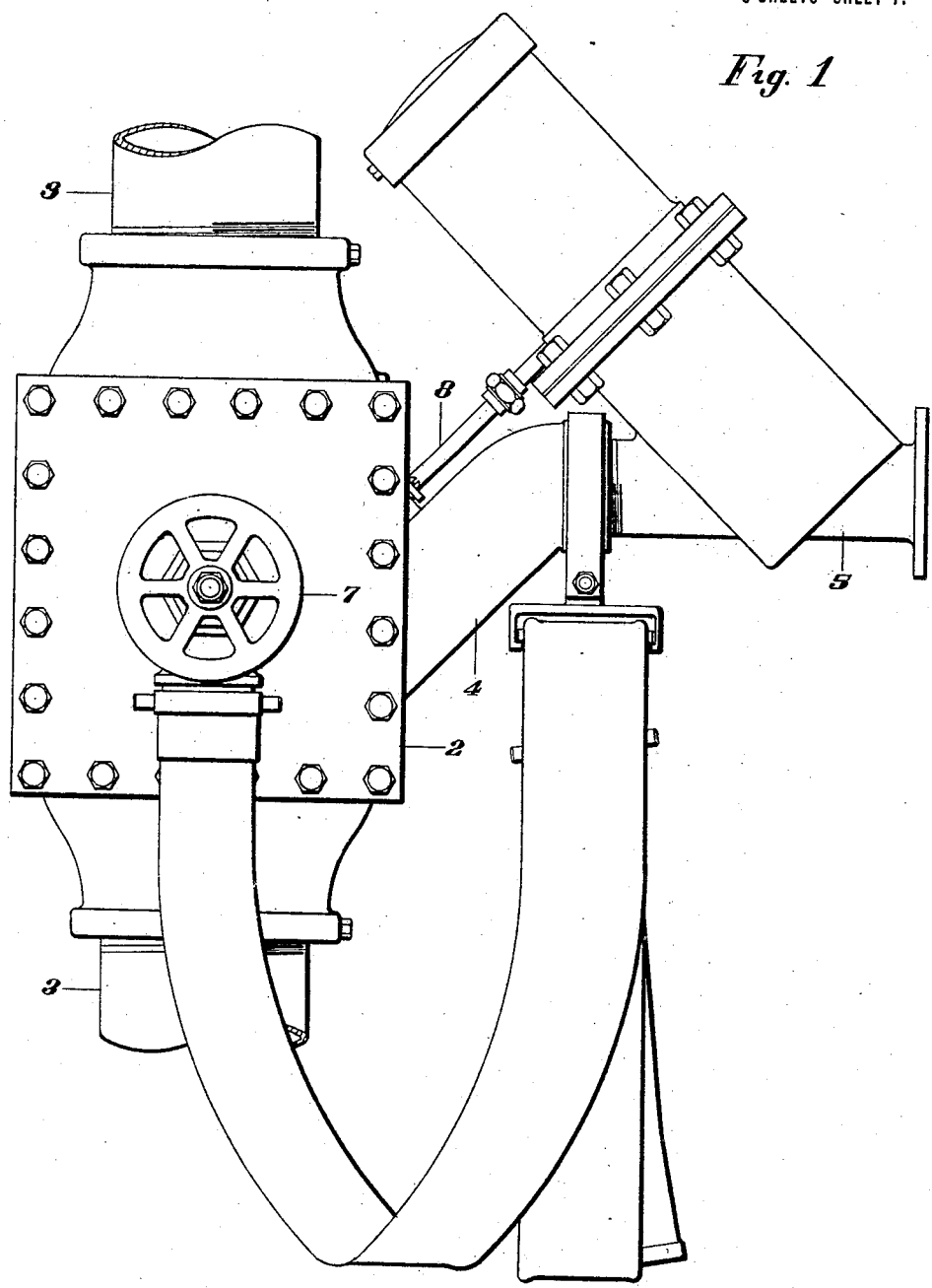

W. F. CONRAN.
FITTING FOR STAND PIPE SYSTEMS.
APPLICATION FILED OCT. 10, 1917.

1,275,532.

Patented Aug. 13, 1918.
3 SHEETS—SHEET 1.

W. F. CONRAN.
FITTING FOR STAND PIPE SYSTEMS.
APPLICATION FILED OCT. 10, 1917.

1,275,532.

Patented Aug. 13, 1918.
3 SHEETS—SHEET 2.

W. F. CONRAN.
FITTING FOR STAND PIPE SYSTEMS.
APPLICATION FILED OCT. 10, 1917.
1,275,532.
Patented Aug. 13, 1918.
3 SHEETS—SHEET 3.
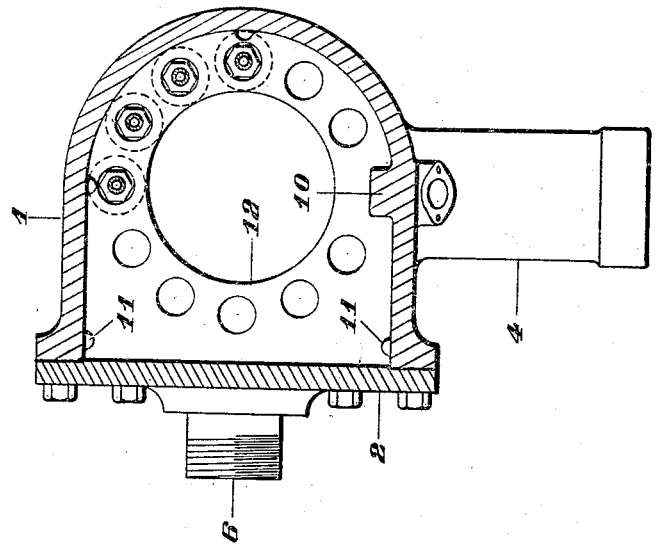
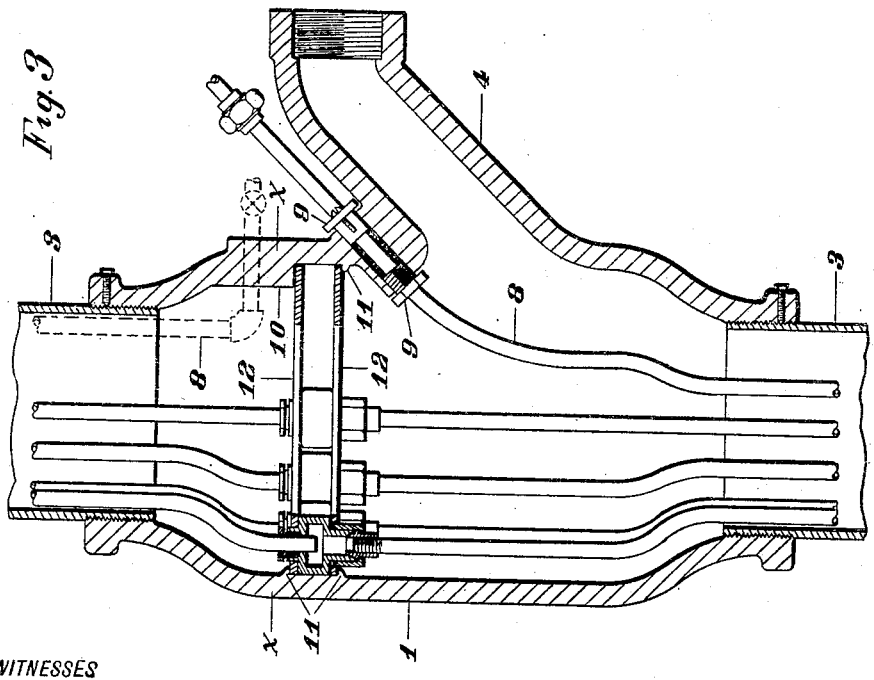

UNITED STATES PATENT OFFICE.

WILLIAM F. CONRAN, OF BROOKLYN, NEW YORK.

FITTING FOR STAND-PIPE SYSTEMS.

1,275,532. Specification of Letters Patent. Patented Aug. 13, 1918.

Original application filed March 26, 1917, Serial No. 157,558. Divided and this application filed October 10, 1917. Serial No. 195,732.

*To all whom it may concern:*

Be it known that I, WILLIAM F. CONRAN, a citizen of the United States of America, residing in the borough of Brooklyn of the city of New York, in the county of Kings and State of New York, have invented a certain new and useful Improvement in Fittings for Stand-Pipe Systems, of which the following is a specification.

This application is a division of my application filed March 26, 1917, Serial Number 157,558, the invention relating to fire extinguishing systems employing a main water supply line or pipe having a number of outlets or branches at various points controlled by hydraulically operated valves which in turn are controlled from distant points or from a common operating station by hand operated control valves; and relating more particularly to a system of movable stand-pipes for buildings such as described in Letters Patent of the United States No. 816,152, granted to me March 27, 1906, but wherein the control pipes leading from the control valves to the hydraulically operated valves are carried within the main water supply pipe or movable stand-pipe, and the present invention relates to the fitting which is placed in the pipe-line for each outlet or branch, and through which a control-pipe projects for connection to the hydraulically operated valve carried thereby, and which fitting also includes the supporting means for the control-pipes carried within the pipe-line, and the means for attaching the hand-valve for a hose-line. This fitting is herein referred to as the Y-fitting.

As described in my said application and patent, the outlets from the water supply or stand-pipe are controlled from an operating station or chamber, and the Y-fitting is placed in the pipe-line at the points of outlet. This fitting may be of any suitable shape, but I prefer to have the body portion semi-cylindrical or U-shaped in cross-section, tapering toward the ends and terminating in screw-threaded or flanged coupling members of the usual pipe sizes. The straight side of the U-shaped body section is open and covered by a flat plate which is provided with a central screw-threaded hole to receive the nipple for the hand-valve to which a hose-line may be attached. The Y-branch may project from either side of the U-shaped body, preferably with a long turn, and with the outlet projecting at right angles to the body of the fitting or pipe-line. Within the upper part of the fitting, and above the Y-branch, are provided two sets of lugs between which retaining plates are held in position for securing the control-pipes which pass through the fitting. For the control-pipe exit at each fitting I provide an enlargement or boss above the Y-branch, which is adapted to be bored to a diameter larger than the control-pipe and provided with packing material and packing rings which will allow longitudinal movement of the control-pipe, thus forming a stuffing-box.

Figure 2:
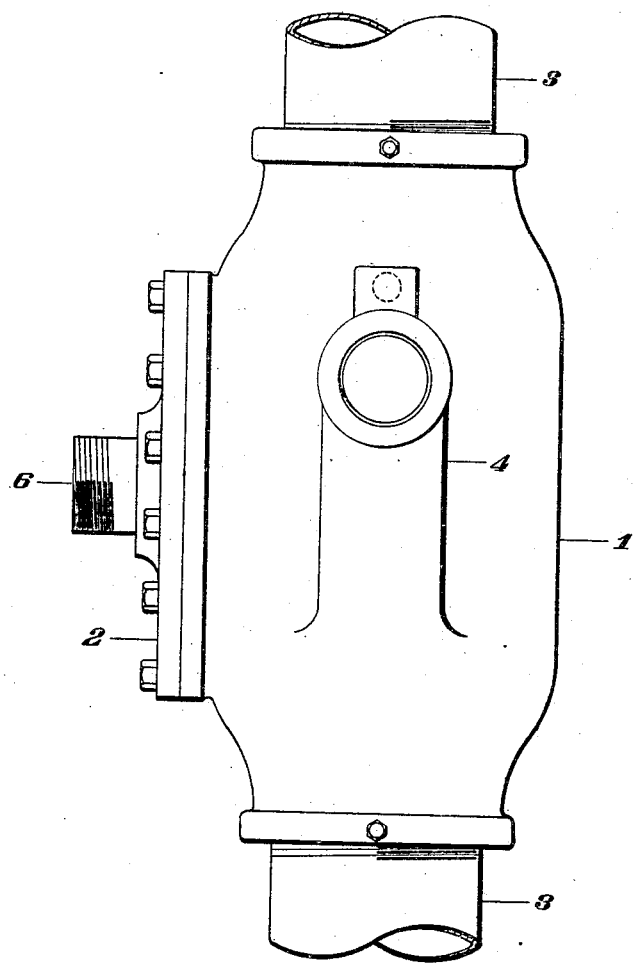

My invention is illustrated in the accompanying drawings, in which Figure 1 is an elevation of the fitting and showing a hydraulically operated valve, hand-valve and hose-line attached thereto; Fig. 2 an elevation of the fitting viewed from the right of Fig. 1; Fig. 3 a vertical central section of the fitting viewed from the left of Fig. 2, and Fig. 4 a horizontal section on the line $x$—$x$ of Fig. 3.

Referring to the drawings, 1 is the body of the fitting having a semi-cylindrical or U-shape in cross-section (see Fig. 4) presenting a flat side which is covered by a plate 2, secured by bolts, and the joint being leaded or packed. The diameter of the body of the fitting is larger than the stand-pipe, and tapers at both ends to pipe size and terminating in the usual bands. As shown the ends of the fitting are screw-threaded to receive the screw-threaded ends of stand-pipe sections 3. The Y-branch 4 projects from the U-shaped body portion of the fitting in a direction parallel with the flat side or plate 2, and the end of this branch may be screw-threaded as shown or flanged to receive the inlet side of the hydraulically operated valve 5. Plate 2 has a centrally located screw-threaded hole into which a nipple 6 is screwed and upon which the hand-valve 7 is mounted. Thus it will be seen that the hand-valve and hydraulic-valve are set at right angles so that in the normal position of the stand-pipe the hand-valve and hose will be readily accessible. One control-pipe 8 is led out of the fitting for connection to the hydraulic - valve carried thereby, and as shown in Figs. 3 and 4, the fitting for this purpose has a boss at the upper angle of the Y-branch which is bored to a diameter larger than the control-pipe and is provided with packing material and packing rings 9 to form a stuffing-box for the control-pipe. The arrangement of control-pipes shown in Fig. 3 is that where the control station is below the Y-fitting, but where the fitting is below the control station, as in a cellar, the control-pipe which is to project through the fitting will extend downward into the fitting instead of upward as shown and the pipe will have an upward bend and pass up through the stuffing-box for connection to the piston chamber of hydraulic valve 5. I prefer, however, in such case, to provide a boss 10 through which pipe 8 shown in dotted lines will pass; the boss being bored and packed as above explained, and pipe 8 outside of the fitting being provided with a pet-cock to drain the pipe and piston chamber when necessary.

At the upper end of the fitting and above the entrance of the Y-branch are two rows of lugs 11 between which are held two U-shaped perforated plates 12, each having a large perforation (see Fig. 4) equal to or larger than the inside diameter of the stand-pipe, and a circular series of small perforations. Seated between plates 12 and projecting through the small perforations are a series of expansion-joints for the control-pipes 8. As shown, these joints are preferably in the form of cylindrical boxes having annular extensions of smaller diameter which fit into the small perforations of plates 12; the upper extensions having a packing and screw-plug forming a stuffing-box for the control-pipe section entering from above the joint, and the lower extension forming one member of a union for attaching the control-pipe section entering the joint from below. The union end of the expansion-joint includes a nipple having its inner end ground conical or spherical to seat against the correspondingly ground end of the box extension, and this nipple has a flange which is engaged by a cap and whereby the nipple is held to its seat. The upper ends of the control-pipe sections are screwed into the nipples and thus each section of control-pipe is supported or suspended by the union ends of the expansion-joints. By this means each section of control-pipe is free to contract or expand lengthwise without straining joints or bowing the pipes, and at the same time the expansion-joints and retaining plates 12 support the control-pipes and hold them in position against the interior of the stand-pipe and prevent lateral displacement.

The purpose of the large opening in the body of the fitting which is closed by plate 2 is to permit the insertion of retaining plates 12 and expansion-joints, and to permit making connections between those joints and the control-pipe sections, and to permit feeding the pipe through the stuffing-box and placing the packing and ring 9 in position, and for making tests, inspections and repairs.

What I claim is:

1. As a new article of manufacture, a Y-fitting for stand-pipes, comprising an open U-shaped body section tapering at both ends into circular sections and arranged for attachment to pipe sections, a branch projecting from the body section, a covering plate for the open U-section, means for securing said plate, a pair of retaining plates within the body section, means for securing said plates in position, and expansion-joints carried by said plates for coupling and supporting small pipes carried through the fitting, substantially as set forth.

2. As a new article of manufacture, a Y-fitting for stand-pipes, comprising an open U-shaped body section tapering at both ends into circular sections and arranged for attachment to pipe sections, a branch projecting from the body section, a covering plate for the open U-section, means for securing said plate, a pair of retaining plates within the body section, lugs projecting from the interior of the body and between which said plates are held, a large central perforation in each plate, a series of small perforations in each plate and in vertical alinement, and a series of expansion-joints carried between said plates and projecting through said small perforations, said joints being adapted to couple small pipes carried through said fitting, and said plates and joints serving to support and hold said small pipes against lateral displacement, substantially as set forth.

3. As a new article of manufacture, a Y-fitting for stand-pipes, comprising an open U-shaped body section tapering at both ends into circular sections and arranged for attachment to pipe sections, a branch projecting from the body section, a covering plate for the open U-section, means for securing said plate, means within the body section for supporting small pipes carried through the fitting, and a stuffing-box through which one such pipe passes to the exterior, substantially as set forth.

4. As a new article of manufacture, a Y-fitting for stand-pipes, comprising an open U-shaped body section tapering at both ends into circular sections and arranged for attachment to pipe sections, a branch projecting from the body section, a covering plate for the open U-section, means for securing said plate, means within the body section for supporting small pipes carried through the fitting, and a stuffing-box located in the angle above the branch and through which one such pipe passes to the exterior, substantially as set forth.

5. As a new article of manufacture, a Y-fitting for stand-pipes, comprising an open U-shaped body section tapering at both ends into circular sections and arranged for attachment to pipe sections, a branch projecting from the body section, a covering plate for the open U-section, means for securing said plate, a pair of retaining plates within the body section, lugs projecting from the interior of the body and between which said plates are held, a large central perforation in each plate, a series of small perforations in each plate and in vertical alinement, a series of expansion-joints carried between said plates and projecting through said small perforations, said joints being adapted to couple small pipes carried through said fitting, and said plates and joints serving to support and hold said small pipes against lateral displacement, and a stuffing-box located in the angle above the branch and through which one such pipe passes to the exterior, substantially as set forth.

This specification signed and witnessed this 14th day of August, 1917.

WM. F. CONRAN.

Witnesses:
HAROLD H. PELZER,
WILLIAM J. O'BRIEN.